Figure 1:
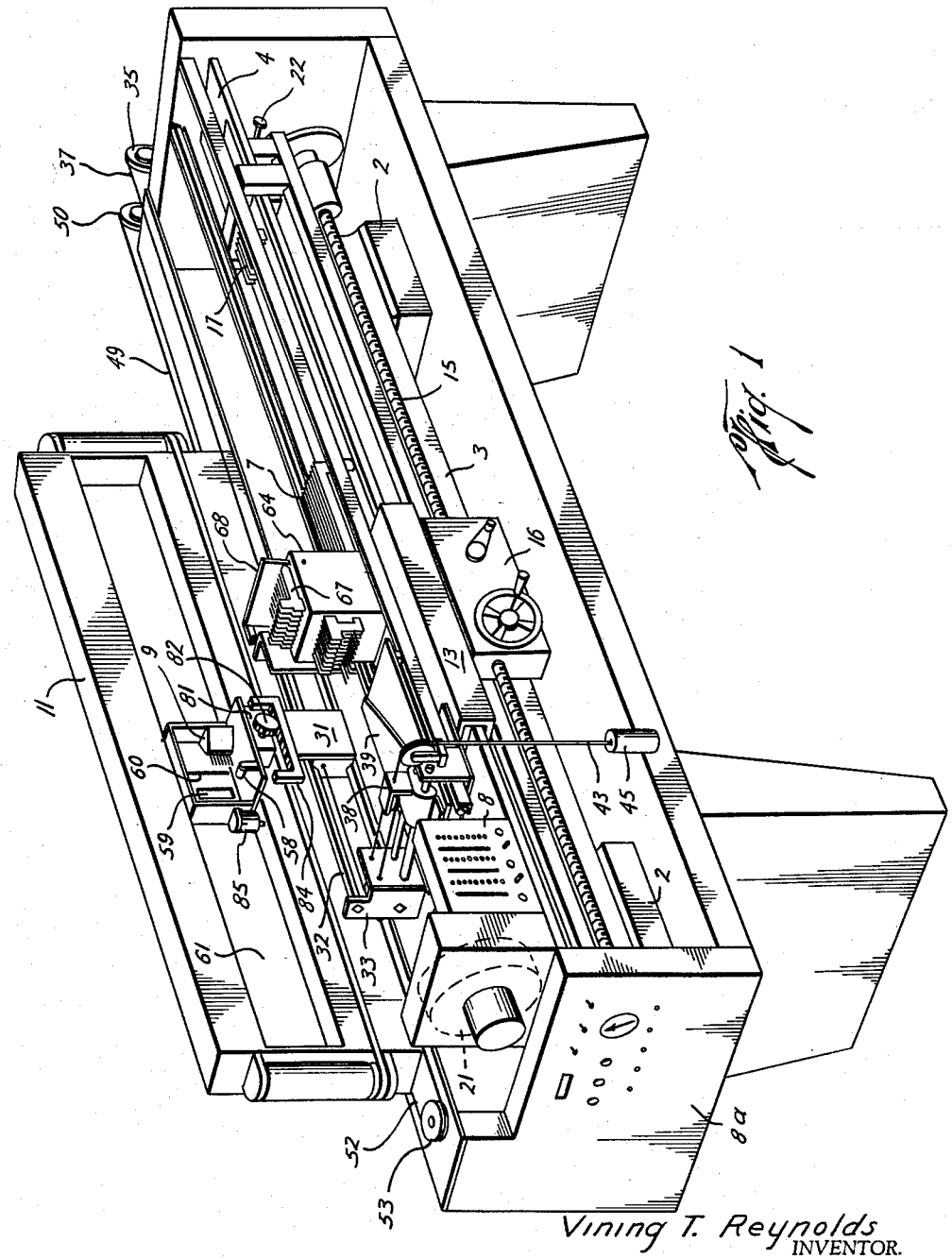

April 5, 1960

V. T. REYNOLDS 2,932,001

SEISMIC RECORD PLOTTER

Filed Feb. 14, 1957

7 Sheets-Sheet 1

Vining T. Reynolds
INVENTOR.

BY G C Helmig

ATTORNEY

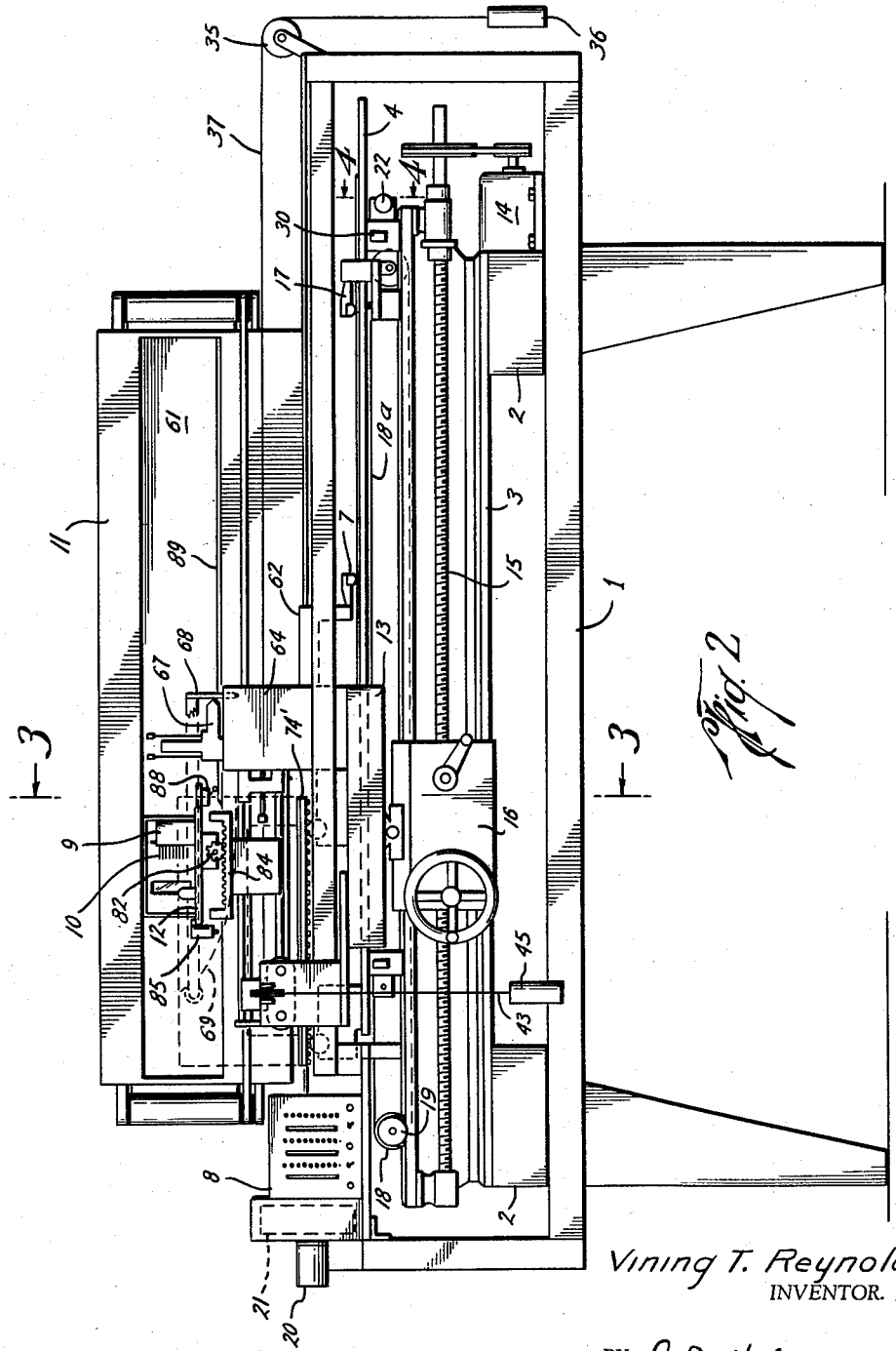

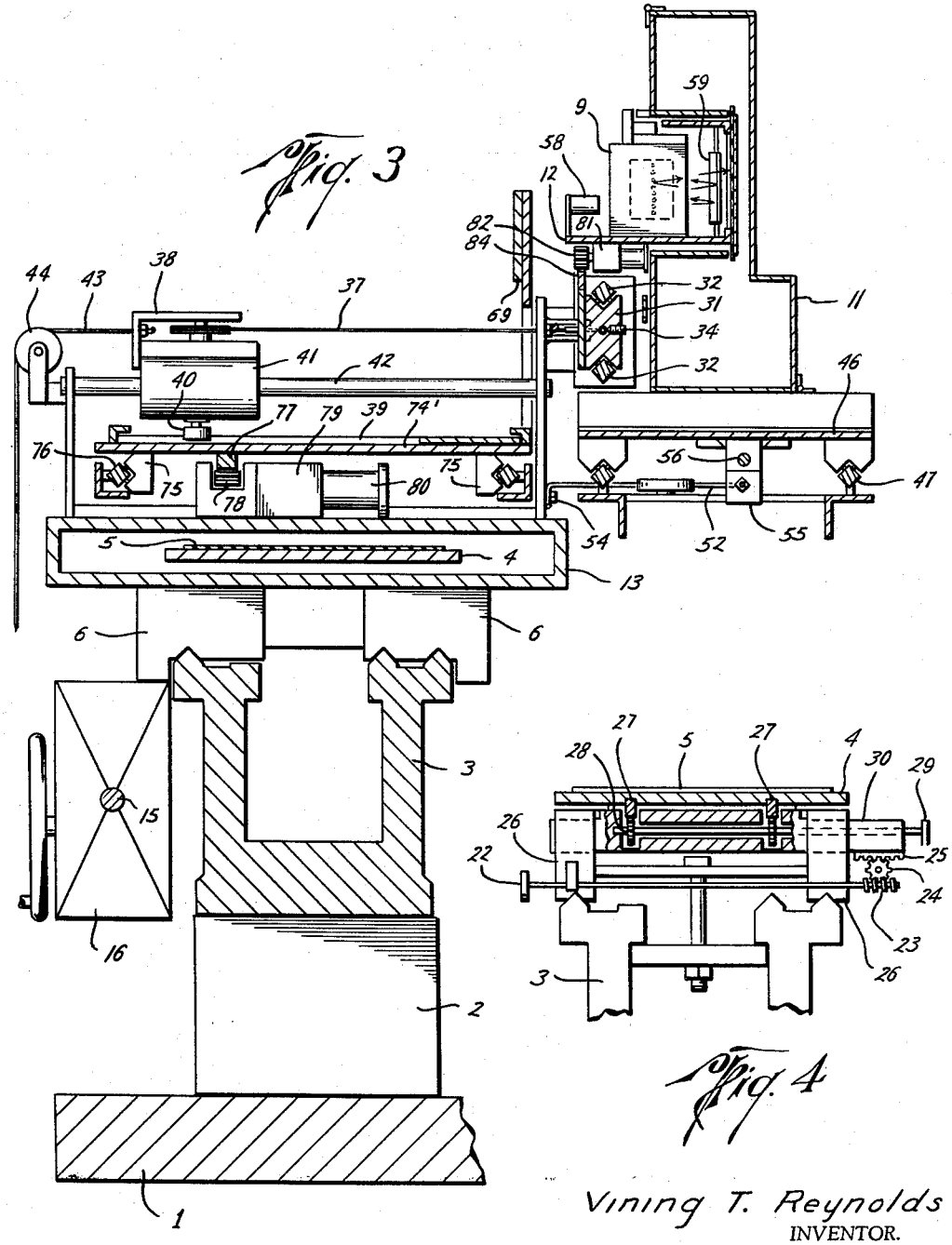

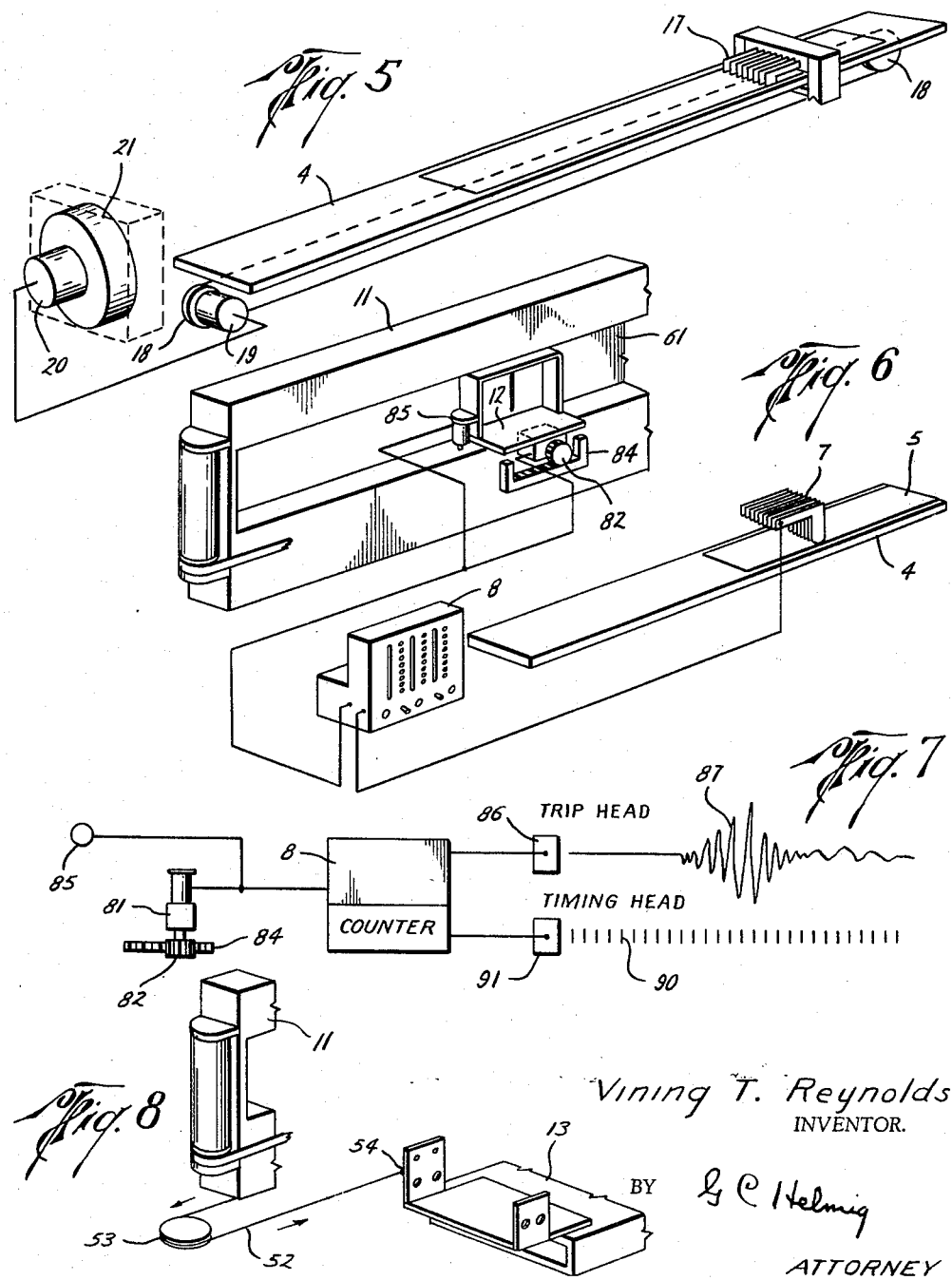

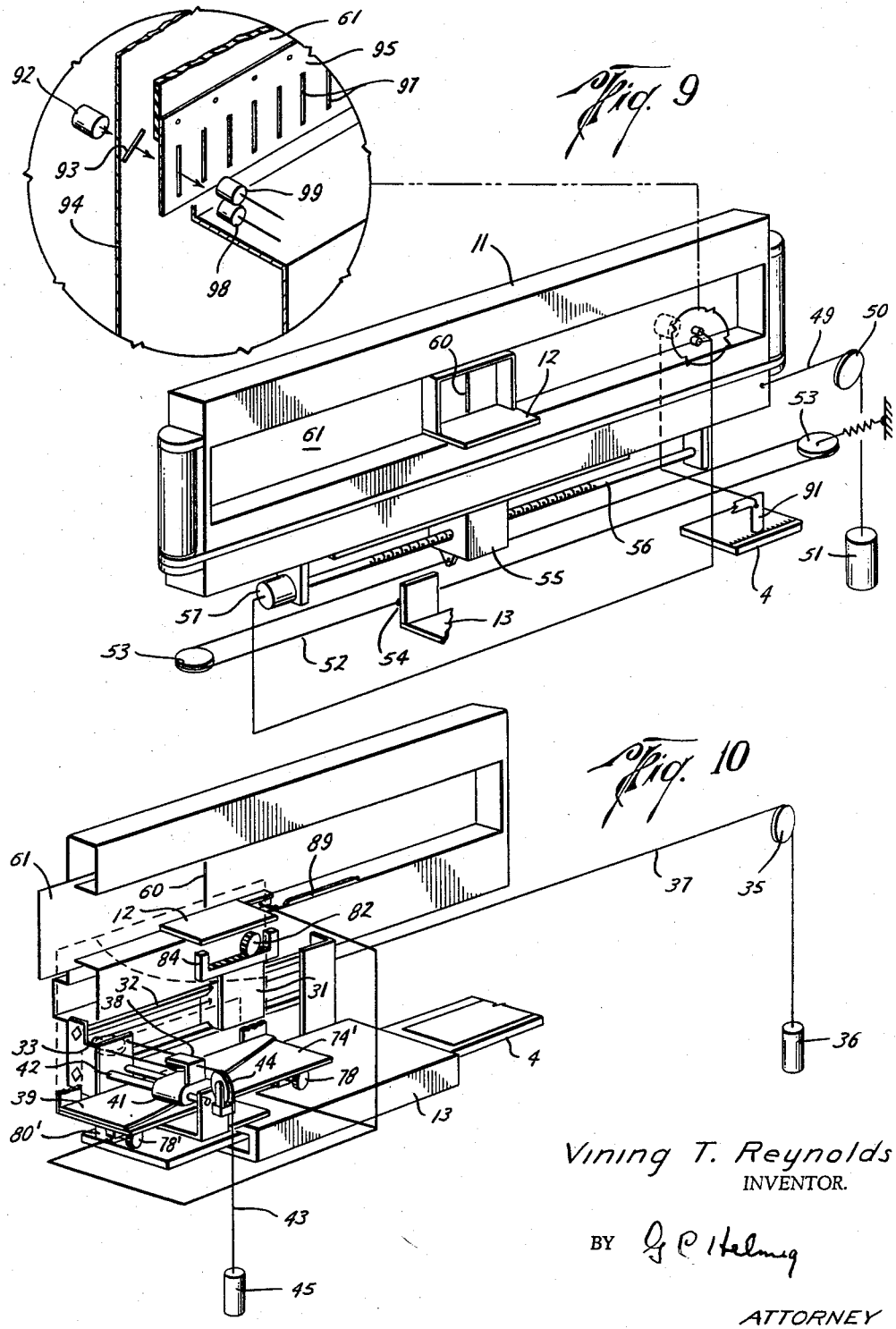

April 5, 1960
V. T. REYNOLDS
2,932,001
SEISMIC RECORD PLOTTER
Filed Feb. 14, 1957
7 Sheets-Sheet 6
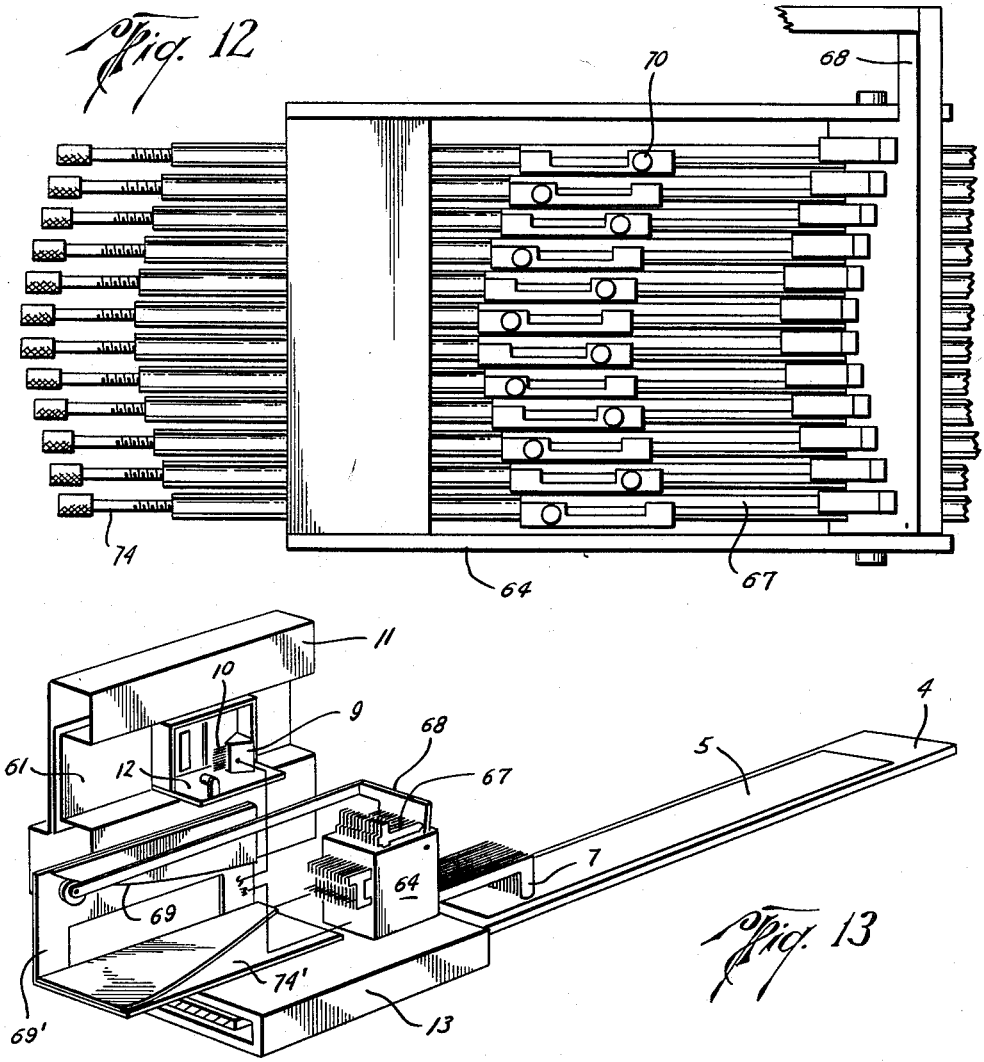
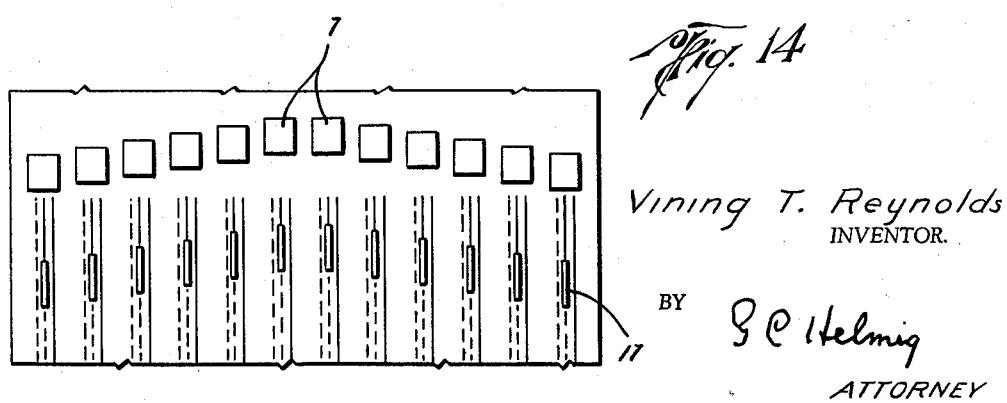
Vining T. Reynolds
INVENTOR.
BY
G C Helmig
ATTORNEY

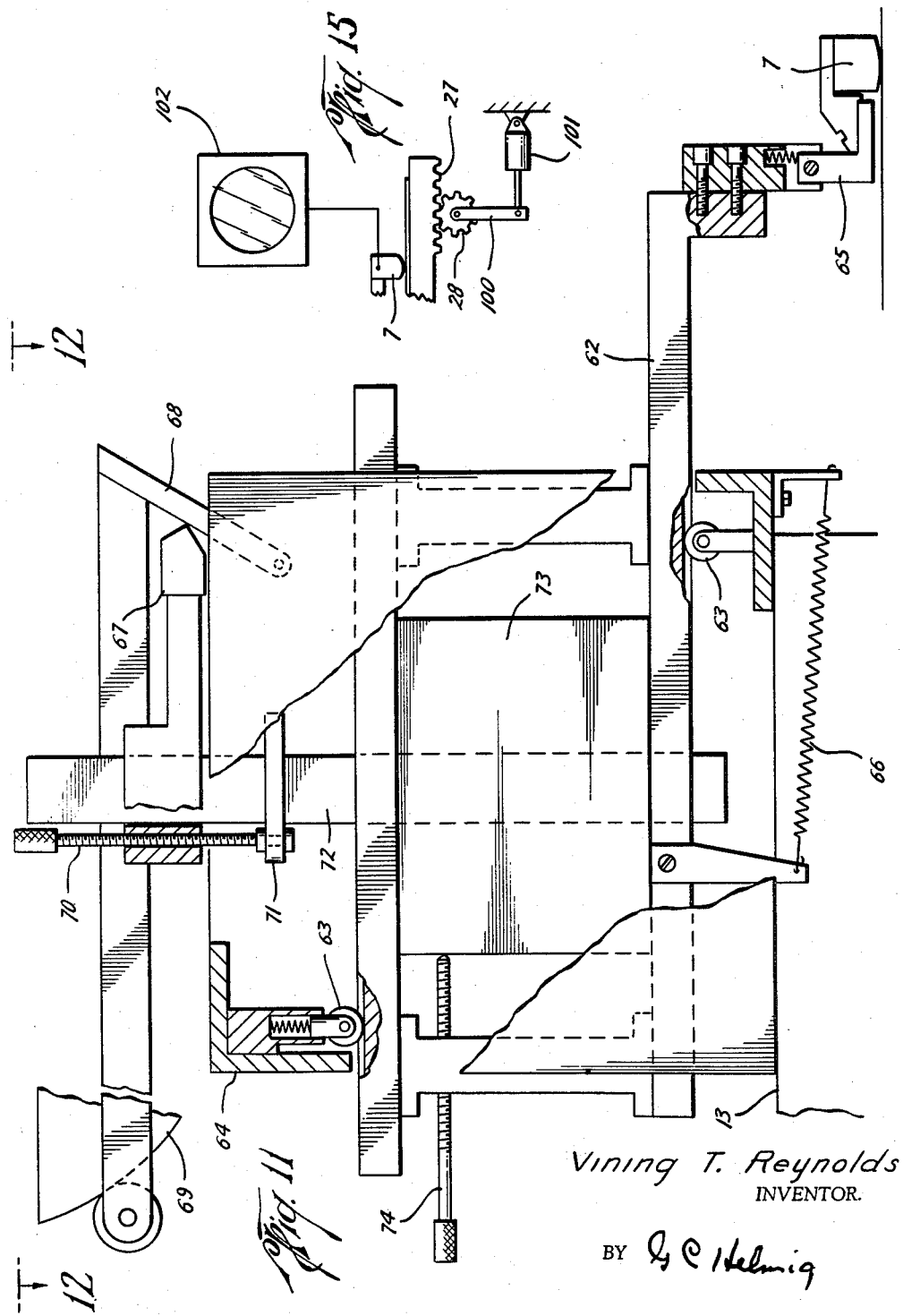

| United States Patent Office | 2,932,001 |
|---|---|
| | Patented Apr. 5, 1960 |

2,932,001

SEISMIC RECORD PLOTTER

Vining T. Reynolds, Houston, Tex.

Application February 14, 1957, Serial No. 640,105

15 Claims. (Cl. 340—15)

This invention relates to the presentation in readily readable form of seismograph record showings of the subsurface earth formation and more particularly to apparatus for transcribing a magnetic record of tremor signals obtained with conventional prospecting equipment into a visual record with corrections for time differences in tremor arrivals at spaced apart detectors from successively deeper reflector surfaces. This application is a continuation in part of patent application Serial No. 436,302, filed June 14, 1954 now Patent No. 2,825,885, dated March 4, 1958.

An object of the invention is to provide a seismograph reproducing machine which simplifies and eliminates much of the tedious work required for interpreting records resulting from seismograph mapping of an area as is done in prospecting for oil.

A further object of the invention is to provide a machine for reproducing a visual transcript from a magnetic recording and which machine can be set up for each reproduction according to known area conditions, such as shot point relation to the several detectors of the exploration equipment, and will so operate that, as a group of scanners traverse adjoining rows of magnetic signals of a seismograph record and respectively respond to signal intensity variation and effect like variation in the oscillation of galvanometer mirrors concurrently traversing and directing light beams to a photographic film, there will also occur mechanical relative adjustments of machine components in compensation for time differences between signal arrivals from each reflector surface and variations resulting from relative detector spacing vertically and horizontally from the shot point, as well as sound velocity changes in tremor passage through successively deeper strata and deflection from straight line paths of tremor travel from the shot point and back to each detector.

Another object of the invention is to provide equipment wherein the rate of progressive scanning of the magnetic tape whose signals were linearly recorded in equal time intervals and the rate of photographic reproduction of such signals are controlled in differential relation according to a given pattern for the survey whereby the visual reproduction indicates events in equal depth increments or in true depth proportion.

Other objects and advantages will become apparent during the course of the following specification having reference to the accompanying drawings, wherein Fig. 1 is a perspective view of the complete machinery assembly; Fig. 2 is a front elevation of the machine; Figs. 3 and 4 are, respectively, transverse vertical sections as on lines 3—3 and 4—4 of Fig. 2; Fig. 5 is a perspective view of a fragment of the machine illustrating the mechanism for magnetically reproducing on a flat tape magnetic signals which previously were recorded on a drum tape; Fig. 6 is a perspective view of a fragment of the machine illustrating the control mechanism which governs the transmission of linear movement to the photographic reproducing mechanism; Fig. 7 is a diagram to illustrate the pickup of magnetic signals by certain scanning heads of the bank in controlling certain operations; Fig. 8 is a fragmentary view showing in perspective the coupling of the traveling carriage with the film magazine for the transmission of travel; Fig. 9 is a perspective view with a selected portion shown on a larger scale and partly in section, of a magazine motion modifying arrangement which will correct for certain mechanical deficiencies; Fig. 10 is a perspective view with parts in section showing those parts of the machine which control the transmission of relative travel from the main carriage to the galvanometer support; Fig. 11 is a detail view on a large scale and with parts in section of the mechanism for adjusting and varying the relation between several scanning heads, only one scanning head being illustrated but which operating connections are duplicated for each head; Fig. 12 is a top plan view as on line 12—12 of Fig. 11; Fig. 13 is a perspective view showing a portion of the machine which deals with the scanning of magnetized portions on a flat strip for causing a response at a bank of galvanometer controlled oscillatable mirrors from which light beams are directed to a photographic film to trace a wave pattern corresponding to the degree of magnetism being scanned at that instant; Fig. 14 is a fragmentary top plan view showing a bank of scanning heads and a bank of recording heads, which latter function to magnetize a tape over which the recording heads travel; and Fig. 15 is a somewhat diagrammatic view indicating an arrangement for imparting relative reciprocation between a magnetic tape and a scanning head and thereby picking up a recorded signal for reproduction on a light screen.

In a preferred embodiment of the invention as shown in the drawings, the machine involves a pedestal supported table top or bed plate 1 carrying end mounting blocks 2 for locating stationary guide tracks 3. Engaged with longitudinally extending and upwardly tapered guide rails of the track unit 3 are end supports 26, as best seen in Fig. 4, for a horizontal tape support plate or strap 4 located for its major extent within the right end half of the machine, as viewed in Fig. 1. The upper face of the plate 4 conveniently is surfaced with a thin layer 5 of rubber or the like, and its purpose is to locate and support a magnetic tape containing signals which are to be reproduced. Also guided on the tracks, as seen in Fig. 3, are runners 6 of a traveling carriage 13, which for convenience may be a hollow block surrounding the magnetic tape supporting plate 4. A bank of scanning heads 7—7 are mounted on the carriage 13 for travel therewith over the magnetic tape and the signals that are picked up are transmitted through the usual wiring to an electronic counter or control box 8 housing various circuit controllers, certain of which are responsive to the operation of the scanning heads and telegraph signals to other components of the machine.

Certain of the signals will be transmitted to a bank of galvanometer units enclosed within a housing 9 and each including a small oscillatable mirror 10 for reflecting a light beam toward a photographic film contained within a magazine 11. Signal responsive oscillation of the galvanometer mirror will vary in proportion to the intensity of the magnetic signal being instantaneously scanned and will produce an undulating trace or wave pattern on the light sensitive film. The galvanometer housing 9 is supported on a traveling plate 12 for movement linearly of the film magazine 11, and operating connections couple the traveling plate 12 with the traveling carriage 13 for their movement in unison and in the same direction during the scanning operation.

Linear motion at a constant rate is imparted to the traveling carriage 13 from a drive motor 14 mounted on the bed plate 1 and belted to a rotatable screw 15 whose threads are engaged by a traveling nut contained within a box 16 which is fast to one of the carriage runners 6. Operating current is supplied to the motor 14 through switches on a control panel 8a, as shown at the left-hand side of the machine in Fig. 1.

Seismograph records made in the field are magnetically recorded on the peripheral surface of a drum. Such drums are transported to the transcribing machine forming the present subject matter, and the drum record is reproduced magnetically on a flat strip supported on the plate 4. For effecting such magnetic reproduction, there is employed a bank of recording heads 17, which also ride on the tracks 3 and in superposed relation to the magnetic tape, the recording travel being from left to right, as viewed in Fig. 2. The magnetic recording heads 17 are fast to an endless chain 18a looped at opposite ends about fixed sprockets 18—18, one of which is driven by a small electric motor 19. A similar motor 20 is arranged to drive the drum shown in dotted lines at 21 and which contains the original seismograph record. Suitable reproducing heads scan the rows of magnetic traces on the drum 21 and are connected in electric circuit with the recording heads 17 for transferring the drum record magnetically on the flat tape record. The motors 19 and 20 may be of the Selsyn type or may otherwise be related for operation at directly proportional speed rates for the driven drum 21 being scanned and the chain pulled recording heads 17.

The mounting of the tape supporting table 4 enables it to be shifted transversely of its length so that records from several related drums may be recorded in rows successively on the same magnetic tape with the spaced apart rows of signal recordings positioned in side by side or stacked relation to one another. This multiple recording is illustrated in Fig. 14, wherein at each of the several spaced groups of signals there is shown the recording head 17 as having completed the reproduction from one drum, as indicated by a solid line, and as being in the process of reproducing signals from a second drum. The broken lines indicate the course of the recording head during its continuing linear movement in completing the second row of signals and, also, the path which will be followed by the recording head in reproducing signals from a third drum. Any number of drum signals can be reproduced on the same tape by shifting the lateral position of the tape support between succeeding recordings and within a total width dimension which is no greater than the scanning width of a scanning head 7 through which magnetic signals in adjoining recorded rows within the scanning area are to be transferred for visual transcription. Thus there may be obtained a final visual trace representative of averages of the combined magnetic signals in a group of rows traversed by a single scanner head and which rows of the group were reproduced in side by side relation from several separate seismograph records as sometimes are made at a given location.

Relative lateral adjustment of the tape support 4 is by manual adjustment of a knob 22, which, as seen in Fig. 4, is on a rotatable shaft carrying a worm 23 in mesh with a small gear 24, whose teeth co-operate with the rack 25 on a shifter rod 30 having slide bearing in the track engaging supports 26—26. To and fro transverse travel of the bearing rod 30 carries with it the tape support 4, whose underside is formed with a gear rack or racks 27 engaging pinions 28 on a transversely extending rock shaft projecting through the slide rod 30 and terminating in a handle knob 29. Operation of the knob 29 will shift the plate 4 longitudinally of its length. This adjustment enables a resetting of the plate 4 before the initiation of linear travel of the recording heads 17, so that stacked recordings can be correlated to one another with relation to a selected datum plane and start of significant signals. The tape support with a tape thereon may similarly be longitudinally adjusted with reference to the starting position of the scanning heads 7 when the machine is to be used for making a photographic visual reproduction.

Reciprocation of the tape support plate 4 to shift any selected signal portion of a magnetic record under the scanning heads 7, with the latter stationarily positioned and at a relative rate of about one inch per second in one direction and at a slightly faster rate in the opposite direction, will enable signal pickup in the scanning circuit from the magnetized tape portion, and by coupling the scanning circuit to an oscilloscope or other suitable viewing instrument, there will be repetitiously flashed on the instrument viewing screen a visual reproduction of the signal segment under the scanner head. The scanner heads can be adjusted to any selected linear position over the magnetized tape to reproduce any desired signal segment of any one or more of the multiple rows of seismic signals. Reciprocation of the tape supporting plate can be through manual manipulation of the handle knob 29, but more conveniently the rock shaft for the pinions 28 may have fixed thereon an oscillatable lever arm 100 (Fig. 15) whose free end is coupled to a push-pull cycling motor 101 to power tape reciprocation under the selectively positioned scanner 7 whose responses are then transmitted to an oscilloscope 102.

Inasmuch as sound velocity varies with density of the transmitting medium and since earth densities increase with depth, the intervals between tremor arrivals from successively deeper strata will be disproportionate to depth increments. Thus the original seismograph record is a linear record in equal time intervals. For producing a transcription in regular intervals of depth, the linear travel of the galvanometer mirror bank relative to the film is made disproportionate to the relative travel between the scanners and the magnetic tape and according to a known velocity pattern for the particular area explored and previously recorded on the magnetic tape. Such disproportionate travel is accommodated by movably mounting and coupling the galvanometer support plate 12 through a traveling block 31 slidably guided on a pair of rails 32 fixed at their ends to supporting brackets 33, which are rigid with and travel with the traveling carriage 13. A motion transmitting cable 37 is secured intermediate its opposite ends, as by a set screw 34, to the traveling block 31, and one end of the cable passes over an idler pulley 35 bracketed on the frame and suspends a counterweight 36 which tends to move the traveling block 31 toward the right, as seen in the drawings. The opposite end of the motion transmitting cable 37 passes over a pulley fixed with the end bracket 33 and after being looped over another pulley supported in a transversely shiftable bracket 38, has its return terminal portion fixedly anchored on the bracket 33. Longitudinal movement of the carriage 13 and brackets 33 toward the right carries along the traveling block 31. The rate of block movement is modified by progressively changing the transverse position of the pulley bracket 38 to increase the effective length of the cable 37 between the carriage 13 and block 31 under the pull of the weight 36. Transverse displacement of the pulley bracket is effected by a sound velocity determined contour of a stationary cam plate 39 whose contoured edge is engaged by a cam follower roller 40 (see Fig. 3) carried by a slider head 41 which rides on a pair of carriage mounted rails 42 and is a part of the pulley bracket 38. A flexible cable 43 passes over a sheave 44 and connects the bracket 38 to a gravity weight 45 to oppose the dominant pull of the counterweight 36. The cam plate 39 is replaceably mounted on the carriage 13 and is one of a set, each contoured in relation to the particular exploration and record being reproduced.

As later to be described in greater detail, the cam plate 39 after having traveled initially a short distance with the carriage 13 and scanners 7 will be released from further travel and will be locked stationarily to the main frame and additionally the galvanometer support plate 12 will be locked for movement with the traveling block 31. Thereafter the scanning heads 7 will continue to travel forward with the power driven carriage, as will also the slide rails 32 for the traveling block 31 and the slide rails 42 for the cam follower head 41 and pulley bracket 38. As controlled by contour of the fixedly held cam plate 39 on which the cam follower roller 40 will now ride, the pulley block 38 under influence of the weight 36 and cable 37 will be pulled rearwardly on the slide rails 42 and the cable length between the pulley block 38 and the traveling block 31 will be increased for accelerating the rate of travel of the block 31 relative to the rate of travel of the bank of scanners 7. In this manner an original record on a time scale is reproduced on a depth scale.

Inasmuch as the usual magnetic tape is within a fairly short over-all length, there will be an advantage in making a visual reproduction of somewhat greater length for convenience of observation. This can be effected by moving the film magazine linearly of and oppositely to the direction of linear travel of the bank of galvanometer mirrors. For that purpose, the bottom of the magazine 11 includes a bearing plate 46 (Fig. 3) which is slidably mounted on a pair of rails 47. The magazine, as in Fig. 9, has projected from its right-hand end a cable 49 which passes over a frame supported pulley 50 and is tied to a counterweight 51. It is also tied to the primary carriage 13, as by means of an endless cable 52 looped at opposite ends over a pair of pulleys 53 carried by the machine frame. One reach of the cable 52 is secured, as at 54, to the traveling carriage 13 and the other reach is secured to a threaded nut 55 on a screw shaft 56 rotatably mounted in bearings on the underside of the magazine 11. The screw 56 can be rotated by an end connection with a drive motor 57 for further shifting the magazine longitudinally, as will later be referred to. Thus carriage travel in one direction is transmitted to move the magazine in the opposite direction to thereby provide a relative travel rate double that of the carriage itself.

The magazine 11 is an elongated box sealed against the entrance of light and enclosing an elongated strip of light sensitive or photographic film, disposed in a vertical plane and preferably connected at opposite ends to winding and unwinding spools to enable successive lengths of film to be brought into position to be acted upon during successive transcribing operations. A recessed or pocketed front face of the film magazine receives the galvanometer housing 9 and the traveling plate 12. A lamp housing 58 is carried by the plate 12 and encloses an electric light bulb whose light beam is reflected from a mirror surface 59 to each of the several oscillatable mirrors 10, and the vertically spaced light pencils reflected from the galvanometer mirrors are directed to the light sensitive film after passing through a narrow vertical slit 60 (see Fig. 1) formed in a longitudinally movable flexible curtain or mask 61 overlying the film. Opposite ends of the mask are wound on spring return rollers, and the intermediate portion of the mask in the region of the slit 60 is fixed to the plate 12 so as to move linearly with the carriage and always present the vertical slit 60 in alignment with the vertical succession of galvanometer mirrors, each of which oscillates about a longitudinally extending horizontal axis. Accordingly, the front wall of the magazine is a traveling curtain to exclude all light except the oscillating beam pencils which pass through the slit 60 during operation of the machine in which the magazine supported film is traversed by the galvanometer mirrors.

Each galvanometer responds to current flow fluctuation in a circuit connecting the galvanometer with the control box 8 and in accordance with the transmission and impression thereon of the magnetic signal being scanned at any instant by one of the scanning heads 7. To correct for arrival delays recorded on the original magnetic tape as between the several detectors in a set, the scanning heads are mounted on the traveling carriage for longitudinal adjustment relative to one another and are also arranged to be relatively shifted longitudinally of carriage travel throughout the scanning operation in compensation for relative velocity changes from progressively increasing depths. As shown in Fig. 11, each scanner head 7 is suspended on one end of a shiftable frame 62, one for each head, which can move longitudinally on supporting rollers 63 mounted in a housing 64 which is a fixed part of the traveling carriage 13. The mounting connection of the scanner head is preferably by means of a downwardly urged or spring biased pivoted lever 65 for keeping the scanning head 7 in proper operative relation to the magnetic tape. Coil spring 66 connected at opposite ends to the housing 64 and to the shiftable frame 62, biases the frame toward the right and maintains an abutment head 67 in engagement with a swinging bell crank 68 pivoted in the traveling housing 64 and engaged at its free end with an operatively stationary cam 69. This cam presents a longitudinally extending edge contour on which the free end of the crank lever rides during carriage travel whereby to swing the lever and shift the head 67.

Contact of the abutment 67 with the lever 68 can be adjusted radially toward and away from the transverse horizontal axis of the swinging lever for obtaining a variable leverage effect, and for that purpose a thumb screw 70 extends vertically upwardly from and has rotatable bearing at its lower end in a bracket 71 and threaded engagement with the abutment 67. The bracket 71 is fixed to a post 72 carried on a slide plate 73 in the movable frame 62 and whose longitudinal position can be varied by its contact with the end of a longitudinally extending thumb screw 74 having threaded engagement with the frame 62. The thumb screw 74 can be preset in accordance with the known vertical spacing from the shot point of the particular detector whose response is recorded on the magnetic tape being scanned by a given reproducing head 7. The horizontal spacing of that detector from the shot point will determine the mechanical leverage adjustment to be effected by the set screw 70 for selecting the abutment point on the lever 68.

The lever 68 will be common to and serve all of the several scanners of the bank. By the relative initial setting of the several scanners selectively as determined by detector spacing from the shot point, and as illustrated in Fig. 14, they will tend to transcribe concurrently the signals from each horizon and which were recorded in delayed time sequence on the original magnetic tape due to variations in travel distance of reflected tremors received by detectors variously spaced from the shot point. Since the relative tremor travel distances to the several geophone detectors and travel velocity also vary with relation to each horizon, correction is made by shifting the scanners relative to one another during the transcribing operation by swing, at a varying rate, of the lever 68, whose free end follows the contour of the cam 69 as predetermined by the earth velocity conditions at each survey. A selected cam plate 69 is detachably mounted in a vertically disposed frame 69' carried by and formed as a part of the flat cam support plate 74', as seen in Fig. 13.

The very first tremors detected and shown on the original magnetic tape are usually inconsequential data. Ordinarily it is desirable to eliminate them in the transcription and relate transcribed reflections to a selected horizontal datum plane, usually below the weathered zone. Provision is here made for the initial movement of the cam plate 39 with the carriage 13 and the carriage mounted bank of scanning heads 7 independently of the galvanometer supporting plate 12 and for stopping the cam plate 39 and initiating travel of the plate 12 with the traveling carriage only after one of the scanning heads responds to a magnetically recorded signal of a significant intensity. For such purposes, a mounting plate 74' for the velocity cam plate 39 has dependent legs 75 (see Fig. 3) on its underside for slidable bearing on a pair of supporting rails 76 fixed with the carriage 13. Also fixed with the underside of the plate 74' is a toothed rack 77 engaging rotatable gears 78 and 78', one mounted on the traveling carriage 13 and the other mounted on a stationary part of the machine. Initially, the carriage mounted gear 78 is clutched against rotation on the rack 77 by a clutch 79 which can be rendered ineffective by actuation of a solenoid 80 connected thereto. The stationarily mounted companion gear 78' initially is free to rotate on the rack 77 and can be locked against rotation by a solenoid actuated clutch unit 80'. In such initial relation of the parts, the cam plate 39 advances in unison with the cam follower 40 upon carriage travel. Solenoid operation will unclutch the gear 78 and clutch the gear 78' to lock the cam plate and enable carriage overrun, whereupon the cam follower 40 pays out the cable 37 for modifying transmitted motion. Another solenoid operated clutch 81 is mounted on the underside of the traveling plate 12 for the bank of galvanometer mirrors and either locks or unlocks a rotatable gear 82 in mesh with a rack 84 at the top of the traveling block 31. With the gear 82 free to rotate, there will be lost motion from the rack 84 to the plate 12. In addition, the traveling plate 12 carries a solenoid 85 with a vertically retractable plunger for engagement with a keeper groove in the adjoining wall of the magazine 11 so as to prevent relative movement until such movement is signaled. This may be accomplished after the fashion diagrammatically illustrated in Fig. 7, where the trip head 86, constituting one of the bank of scanners 7, responds as it picks up a tape recorded magnetic signal of a given intensity, illustrated by the exaggerated wave 87, and transmits the signal to the control box 8 for closing a circuit containing the latch plunger retracting solenoid 85 and the solenoid for actuating the clutch 81 to lock the gear 82 against rotation. Linear movement of the rack 84 through its cable connection with the carriage 13 will now carry forward the plate 12. Immediately such movement occurs, a switch 88 mounted on the plate 12, as seen in Fig. 2, will have its actuating lever brought into engagement with a raised rail 89 for holding the switch closed and directing current to the clutch coils 80 and 80' so as to free the gear 78 and lock the gear 78' against rotation whereby the cam plate 39 is held fast and its follower 40 now comes into action for modifying the rate of galvanometer mirror travel.

Again referring to Fig. 7, the spaced scales indicated at 90 represent equal increments of time markings recorded on the magnetic tape, and these are scanned by a head 91 of the bank to transmit signals in regular sequence to the control box 8, which, in turn, causes intermittent lighting of a lamp within a housing 92, shown in Fig. 9. The light beam from the lamp housing 92 is projected forwardly on a line below the light sensitive film contained within the magazine and through a slit 93 disposed diagonally at an angle of approximately forty-five degrees from the vertical. The slit 93 is in a stationary screen 94 forming a part of the magazine 11. Overlying the slit 93 is a masking strip 95 carried by or formed as a part of the traveling mask 61, which, as previously mentioned, is tied for concurrent movement with the galvanometer supporting plate 12. This masking strip 95 is provided with a succession of equally spaced vertical slits 97, which, during mask travel, come into alignment, one after the other, with the slit 93. If the central regions of the angularly related slits 93 and 97 come into alignment at the instant of illumination of the lamp 92, the light beam will be centralized between a pair of vertically spaced photo-cells 98 and 99. If, however, the energization of the light within the housing 92 occurs at a time when the angularly related slits 93 and 97 are not centered, then the light beam through both slits will be either raised or lowered and actuate one or the other of the photo-cells 98 and 99. Actuation of a photo-cell connected respectively to a reversible motor 57, causes rotation in one direction or the other of the screw 56 to thereby shift the traveling nut 55 and momentarily accelerate, either up or down, the motion transmitted from the cable 52 to the magazine 11 so as to correct for motion transmission deficiencies and insure that the transcription of the signals will occur in the proper sequence.

When visually transcribing a series of related magnetic seismograms recorded at aligned adjoining sections of the mapped area, the several field-made drum records are placed in proper succession in the machine and after each drum record is individually photographed, the winding roll for the light sensitive film is turned through a predetermined angle of revolution to shift the already exposed portion of the film out of recording range for bringing up the next unexposed film portion. Side by side photographic reproductions of individual magnetic seismograms in neighboring section order will give a final visual cross section of the area.

For indexing the film between each reproduction, a small electric motor is connected to the film winding roll and current is supplied to the motor for a short interval at the completion of the reproduction stroke of the main carriage. Each of the several machine operations can be controlled individually, but the machine can be set up to perform continuously in making up a complete cross section and the various responses can be controlled through the electronic counter 8 for an automatic cycling. Thus after the first field drum 21 is placed in the machine, a master switch is manually closed to initiate machine operation. A first occurrence will be the energization of the motor 18 for carrying the head assembly 17 from right to left, and the magnetic tape on the plate 4 will be erased or cleared of magnetism. When the head assembly 17 reaches its left-hand limit of travel, it will contact and actuate a limit switch to signal and cause reversal of the motor 18 and the simultaneous energization of the motor 20 for the drum 21 and the mechanism for scanning the drum and transferring the signals magnetically to the flat tape at a constant rate as the head assembly 17 travels toward the right. As the travel limit toward the right is reached, a limit switch is actuated to cut out the motors 20 and 18 and to energize the main drive motor 14. With movement of the main carriage 13 toward the right, the tape carried magnetic record is now transcribed on the photographic film with various compensating corrections being made during the course of carriage travel. At the right-hand limit of carriage travel, another limit switch is actuated to effect reversal of the drive motor 14 for return of the carriage to its left-hand limit of travel and also to actuate the film winding mechanism for bringing up an unexposed film portion, whereupon the circuit controllers act to cut off the motor 14 and again start the motor 18 for a repeat cycle. During each photographic transcription interval, the machine operator will have replaced the previously reproduced drum 21 with another drum containing the succeeding seismogram. When several drum records are to be recorded in side by side relation on the tape as previously described in connection with Fig. 14, the master control box 8 will be set up so that after each drum record individually and in succession is transcribed to the tape the head assembly 17 will be returned to the recording starting point without erasing the transferred signals and during such return the transcribed drum will be replaced with a new drum and the control knobs 22 and 29 will be readjusted for a repetition of the transfer from the drum to the tape until the final drum of the series has been magnetically reproduced. Thereupon the multiple recordings transferred to each of the several tape zones can be scanned together for an average in the photographic reproduction. In this manner a complete cross section can be made up from the several individually recorded drum records without stopping the machine.

What is claimed is:

1. In a machine for transcribing magnetically recorded signals into a visual record, a record sheet holding device adapted to hold a sheet on which a visual record is to be transcribed, a bank of recording markers separably operable for transmitting record marks to a sheet held in said device, mountings for said markers and said device accommodating their relative travel during a transcribing operation, a support for a magnetic record to be transcribed, a plurality of scanning heads for individually scanning different magnetic records simultaneously, power drive mechanism imparting relative scanning movement between said scanner heads and said support and concurrent relative travel between said record sheet holder and said bank of markers and including a motion modifying transmission effecting said relative travel at an accelerated rate in relation to the rate of said relative movement and differential drive connections shifting said scanner heads relative to one another and marker actuating mechanism responsive to signals transmitted by said scanner heads and to variations in magnetism detected by the scanner heads.

2. The structure of claim 1 wherein each record scanner head is of a width to scan concurrently a number of related magnetic records arranged side by side and wherein the resultant actuation of a marker superimposed the combined magnetic record signals in a single visual transcription.

3. A machine for making a visual transcript of magnetically recorded signals including a magazine for enclosing a light sensitive film, a bank of galvanometers having mirrors to direct light beams to a film in the magazine, means to mount said magazine and said bank of galvanometers for relative linear travel one to the other, a support for a magnetic tape having several signal recordings linearly of the tape and in side by side rows, a group of signal scanner heads, on for each magnetic record row on said tape, means to impart relative linear movement between said tape support and the several scanner heads and a variable leverage motion modifying drive operating in timed relation to such movement and effecting relative linear travel of said magazine and said galvanometers at a progressively increasing accelerated rate to said relative movement and circuits connecting the scanner heads respectively each to a different galvanometer for response of the latter to changes in magnetic recordings being scanned.

4. In a machine as in claim 3 together with motion transmitting connections responsive to relative movement between said support and the several scanner heads and compelling said scanner heads to be linearly shifted individually and relative to one another according to a given pattern.

5. A machine as in claim 3 together with a bank of transversely spaced magnetic recording heads arranged to traverse said tape support for impressing signals in transversely spaced apart linear paths on a supported flat tape, and means for relatively adjusting said tape support and said bank of recording heads in a transverse direction and within a dimensional extent less than scanner head width.

6. A machine as in claim 5 together with means to adjust the relative linear positions of the tape support and said bank of recording heads so that the initiation of successive recordings may be related one to another.

7. A machine as in claim 3 together with magnetic recording means mounted to traverse the tape support linearly of the supported tape for impressing signals thereon and an adjustable connection operable to effect a relative linear setting of the magnetic recording means and said tape support.

8. A machine for making a visual transcript of magnetically recorded seismic signals received and recorded in equal increments of time and for showing the reproduced signals on the transcript and in equal increments of depth including a support for a tape containing magnetically recorded signals to be reproduced, a bank of signal scanners for traversing said tape, a bank of light beam reflecting and oscillatable mirrors operatively coupled each with a different scanner and oscillatable in response to scanner pickup of magnetically recorded signals, a magazine containing photographic film to which the mirrored light beams are directed, and power drive connections including motion transmitting means imparting relative travel between said scanners and the tape support and variable speed motion transmitting means imparting relative travel between said mirrors and said magazine at an accelerated rate in relation to the rate of and concurrently with relative travel between said scanners and the tape support.

9. The machine of claim 8 wherein a film covering mask co-operates with the magazine to exclude extraneous light but has a light passageway into the magazine aligned with the mirrored beams throughout the relative travel of the magazine and bank of mirrors, said mask also having therethrough a row of equally spaced apart slits extending in directions parallel with one another, a light source fixed with the magazine and arranged to direct a light beam through said slits individually as each comes into alignment therewith in said relative travel, a screen fixed in the path of said light beam and provided with a light passing slit extending in a direction in intersecting and angular relation with the slits in the mask, the directions of the mask and screen slits extending one perpendicular to the direction of relative travel between the magazine and said bank of mirrors and the other direction extending diagonally of the extent of the first direction, a pair of photo-cells spaced apart on opposite sides of a centralized light beam passed through the overlapping slits and to receive the beam respectively on opposite sides of the centralized zone and a power means responsive to the actuation of either photo-cell to shift the magazine to or fro in the direction of said relative travel.

10. In a machine for making a visual transcript of magnetically recorded seismic signals, a support for a tape containing parallel rows of magnetically recorded signals, a motor driven carriage mounted to linearly traverse said tape at a substantially constant rate, a bank of scanners, one for each row of signals, carried by said carriage in scanning relation with said signals, means responsive to carriage travel and operative on said scanners to shift the scanners relative to one another according to a predetermined pattern in corrective compensation for relative detector spacing from the shot in the original seismic recording operation, a bank of light beam reflecting galvanometer mirrors movably mounted on the carriage for movement with and also relative to said carriage, means operatively connecting said galvanometer mirrors each with a different scanner for mirror movement to scanner response, a carriage motion transmitting connection with said bank of mirrors having motion modifying means operative to progressively accelerate the travel of said mirrors in relation to the constant rate of carriage travel according to a predetermined depth velocity pattern and a photographic film containing magazine mounted on the support in traversing relation to said bank of mirrors for presenting a photographic film in the moving path of light beams reflected from said mirrors.

11. In a machine as described in claim 10 wherein said magazine is mounted on the support for travel linearly of the travel direction of said bank of mirrors and has motor means operative to move the magazine in either of opposite directions and wherein the magnetic signals include signals in equal intervals of recording time and one of the scanners scans such time signals, a light source connected with the time signal scanner for energization as each time signal is scanned, a pair of photo-cells connected for the actuation of said motor means and a guaging device responsive to travel speed change of said bank of mirrors in relation to the magazine for directing light from said light source to one or the other of said photo-cells for varying instant relative travel of said bank of mirrors and the magazine.

12. In a machine of the character described a support for a magnetically recorded seismogram, a traveling carriage for a seismogram scanner carried thereby, scanner actuated seismogram reproducing means including a component unit arranged to travel relative to said carriage, means to drive said carriage and means to transmit motion from the carriage to said unit at a differential rate from that of carriage travel and comprising a cam plate, a first connection operable to lock the cam plate for travel with the carriage, a second connection operable to lock the cam plate in fixed relation with said support, a cam follower movable with the carriage and connected with said unit and means responsive to the transmission from said scanner of a given signal for releasing said first connection and for operating said second connection.

13. In a machine of the character described, a support for a magnetically recorded seismogram, a traveling carriage for a seismogram scanner carried thereby, scanner actuated seismogram reproducing means including a component unit arranged to travel relative to said carriage, means to drive said carriage and means to transmit motion from the carriage to said unit at a rate different from that of carriage travel and comprising a cam plate having a releasable connection with the carriage for travel therewith, a cam follower mounted on the carriage for travel therewith and joined by a lost motion connection with said unit, means responsive to the transmission from said scanner of a given signal for rendering the lost motion action of said connection ineffective, an electrically actuated device operative to release said cam plate connection to the carriage and a switch operative in response to travel of said unit beyond its initial starting position for closing a circuit containing said electrically actuated device and for the actuation thereof.

14. For making a visual transcript of a magnetically recorded seismic record, a flat support on which the magnetic record can be placed in a flat plane, a first traveling carriage mounting a bank of scanning heads to traverse said record, drive means therefor, a second traveling carriage mounting a bank of devices connected with said scanning heads and operative with record response of said scanning heads to imprint resultant indicator traces, means to impart motion from the first carriage to the second carriage including a cable connection between the carriages having therein a cable entrained pulley movable with the first carriage, a cam follower fixed to said pulley and a cam plate engaged by said cam follower, means releasably latching said cam plate to the first traveling carriage for travel therewith, means responsive to the response of one of said scanning heads to a record signal of given intensity whereby to release the cam plate latching means and other means active upon such release to fix the cam plate against travel with the carriage whereupon the carriage mounted cam follower rides on the fixed cam plate for shifting pulley position in modifying the rate of motion transmitted to the second carriage.

15. The structure of claim 14 wherein the means to latch the cam plate to the carriage and the means to fix the cam plate against travel comprise a gear rack fixed with the cam plate, a pair of gears in mesh with the rack and rotatably mounted respectively on the first traveling carriage and in fixed relation with the support and a pair of clutches operable to lock said gears against rotation each in alternate relation to the other.

References Cited in the file of this patent

UNITED STATES PATENTS

| | | |
|---|---|---|
| 2,243,730 | Ellis | May 27, 1941 |
| 2,440,971 | Palmer | May 4, 1948 |
| 2,604,955 | Hawkins | July 29, 1952 |
| 2,620,890 | Lee | Dec. 9, 1952 |
| 2,686,633 | Hale | Aug. 17, 1954 |
| 2,703,150 | Rieber | Mar. 1, 1955 |
| 2,712,694 | Herbold | July 12, 1955 |
| 2,821,892 | Merten | Feb. 4, 1958 |
| 2,825,885 | Reynolds | Mar. 4, 1958 |
| 2,861,507 | Palmer | Nov. 25, 1958 |
| 2,876,428 | Skelton | Mar. 3, 1959 |